US006616214B2

(12) United States Patent
Wattebled

(10) Patent No.: US 6,616,214 B2
(45) Date of Patent: Sep. 9, 2003

(54) AUTOMOBILE VEHICLE WITH A SLIDING DOOR AND A SWINGING DOOR INDEPENDENT FROM EACH OTHER

(75) Inventor: Christian Wattebled, Sailly Flibeaucourt (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/945,630

(22) Filed: Sep. 5, 2001

(65) Prior Publication Data

US 2002/0027375 A1 Mar. 7, 2002

(30) Foreign Application Priority Data

Sep. 5, 2000 (FR) ............................................ 0011301

(51) Int. Cl.[7] ................................ B60J 5/04; B60J 5/06

(52) U.S. Cl. ...................... 296/146.1; 296/155; 292/26; 292/51

(58) Field of Search .......................... 296/146.1, 146.9, 296/155; 292/11, 26, 27, 47, 51

(56) References Cited

U.S. PATENT DOCUMENTS 3,561,802 A * 2/1971 Brockway .................... 292/27
3,857,594 A * 12/1974 Pastva, Jr. .................... 292/27
4,561,690 A * 12/1985 Shinjo et al. ............... 296/155
5,172,945 A * 12/1992 Doherty et al. ............... 292/49
5,172,947 A 12/1992 Schap ................... 292/341.16
5,398,988 A 3/1995 DeRees et al. ............. 296/155

FOREIGN PATENT DOCUMENTS

DE 1678017 * 12/1969 .................. 292/27

* cited by examiner

*Primary Examiner*—Dennis H. Pedder
(74) *Attorney, Agent, or Firm*—Liniak, Berenato & White

(57) ABSTRACT

The motor vehicle comprises a swinging door (PB) and a sliding door (PC) which are mounted in the frame (BA) of the vehicle without a central post between the swinging door and the sliding door. In this vehicle, a first lock (PS) is intended to connect the swinging door (PB) to the sliding door (PC), at least one second lock (DS) is intended to connect the swinging door to the frame of the vehicle, and at least one third lock (TS) is intended to connect the sliding door (PC) to the frame (BA) of the vehicle. The first lock has two latch bolts forming a gripper which closes around a striker thus allowing one of the two doors to be closed and/or opened independently of the other door.

6 Claims, 3 Drawing Sheets

AUTOMOBILE VEHICLE WITH A SLIDING DOOR AND A SWINGING DOOR INDEPENDENT FROM EACH OTHER

BACKGROUND OF THE INVENTION

1. Field of the Invention

The invention relates to a motor vehicle comprising a swinging door and a sliding door which are mounted in the frame of the vehicle without a central post between the swinging door and the sliding door.

2. Description of Related Art

The vehicle according to the invention is more particularly a vehicle of the single-volume type comprising, along one of its sides, for example a sliding rear door and a swinging front door. With this construction, the sliding door and the swinging door are contiguous when they are closed and the absence of the central post improves access to the interior of the vehicle.

It is necessary with this type of construction vehicle opening leaf to provide a lock connecting the sliding door to the swinging door in order to improve the mechanical strength of the vehicle, this lock being intended to withstand the forces between these two doors and thus reduce deformation of the vehicle in the event of an accident.

In the prior art, this lock is a conventional lock which is mounted on the swinging door and which connects to a striker mounted on the sliding door. With this conventional lock, closing the swinging door is possible only if the sliding door is closed, and closing the sliding door is possible only if the swinging door is open.

SUMMARY OF THE INVENTION

The purpose of the invention is to overcome this drawback by proposing an arrangement whereby the swinging door and the sliding door can be opened and closed independently of one another.

To this end, the subject of the invention is a motor vehicle comprising a swinging door and a sliding door mounted in a frame without a central post between the swinging door and the sliding door, and which comprises a first lock for connecting the swinging door to the sliding door, at least one second lock for connecting the swinging door to the frame, at least one third lock for connecting the sliding door to the frame and wherein the first lock has two latch bolts forming a gripper which closes around a striker.

With this two-latch bolt construction of the first lock, the striker can be engaged between the two latch bolts by arriving in two different directions with respect to the first lock, which means that the swinging and sliding doors can be opened and closed independently of one another. Furthermore, the second and third locks allow one of the doors to be closed when the other is open.

According to one preferred embodiment of the vehicle according to the invention, the first lock comprises a slider which can move in terms of translation between a "deployed" position and a "retracted" position and two latch bolts mounted so that they can rotate and forming a gripper which is open when the slider is in the "deployed" position and which is closed when the slider is in the "retracted" position and a pawl capable of immobilizing said slider when it reaches the "retracted" position so as to keep the gripper closed and so as to release said slider when a handle for opening the lock is actuated, said latch bolts also being connected in movement to said slider so that said gripper closes around a striker when said striker presses against the slider and causes it to move from the "deployed" position to the "retracted" position.

With this arrangement of the first lock, the striker can be mounted on the sliding door and the lock on the swinging door, or vice versa.

According to yet another particular embodiment of the vehicle according to the invention, the two latch bolts of the first lock are coupled in terms of movement by a gearset and the slider is connected in terms of movement to just one of the two latch bolts which simplifies the spring-return mechanism of the lock and reduces its cost of manufacture.

According to yet another particular embodiment of the vehicle according to the invention, said pawl releases said slider when a handle for opening the swinging door is actuated and said pawl releases said slider when a handle for opening the sliding door is actuated which makes it possible for the first lock to be opened irrespective of the opening of the sliding rear door or of the swinging front door.

According to yet another particular embodiment of the vehicle according to the invention, the swinging door is connected to the frame by several second locks which are adjusted in such a way that when the swinging door is closed, there is a second lock which is always the last to close, this second lock being fitted with a closure detector, which makes it possible to obtain a reliable indication that the door is correctly closed.

According to yet another particular embodiment of the vehicle according to the invention, the sliding door is connected to the frame by several third locks which are adjusted so that when the sliding door is closed, there is one third lock which is always the last to close, this third lock being fitted with a closure detector.

According to yet another particular embodiment of the vehicle according to the invention, the closure detector is an electric switch which reacts to a striker being pushed into the lock.

In this way, a user cannot act upon the detector to deliberately change its state, for example with a view to driving along with the corresponding door open.

The invention will now be described in greater detail and with reference to the appended drawings which illustrate one nonlimiting example of the embodiment thereof.

DETAILED DESCRIPTION OF PREFERRED EMBODIMENTS

The vehicle according to the invention is, in particular, a vehicle of the type known as a "single-volume" vehicle comprising, along one side, a swinging front door PB and a sliding rear door PC mounted in the frame BA of the vehicle without a central post between the door PB and the door PC.

Figure 1:
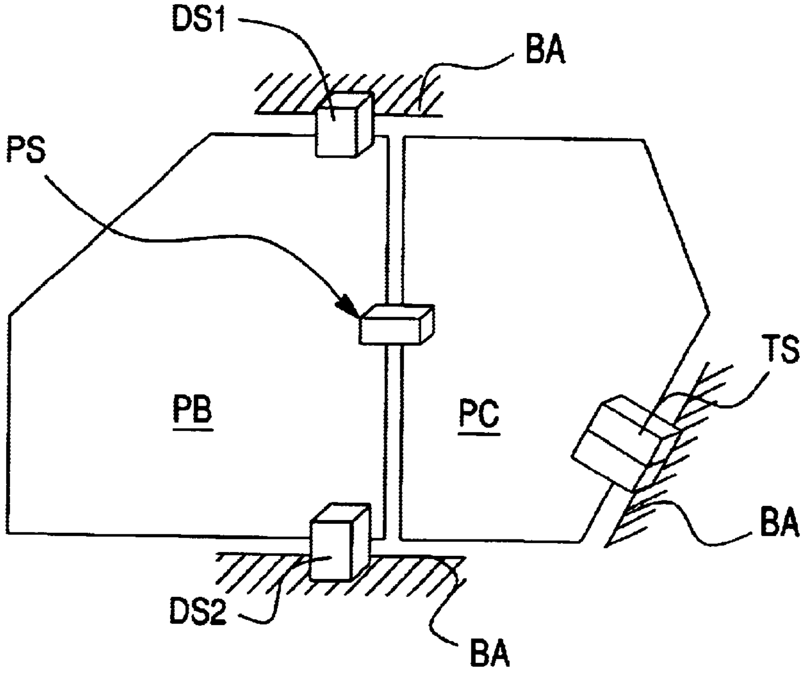
FIG. 1 is a schematic overall view of the doors of the vehicle according to the invention.

In FIG. 1, the swinging door and the sliding door are joined together by a first lock PS which here is mounted on the swinging door PB. The striker corresponding to this lock is therefore mounted on the sliding door PC.

Furthermore, the swinging door PB here is connected to the frame BA by two second locks DS1 and DS2 mounted respectively in the upper part and in the lower part of the swinging door and the sliding door PC here is connected to the frame BA by a third lock TS mounted on the rear part of the sliding door PC. The invention is not restricted to the number of second and third locks connecting the doors to the frame.

Given, in particular, the features of the first lock PS, which will be detailed later on, the swinging door PB and the sliding door PC are capable of being closed and opened independently of one another. What happens is that if the sliding door is open, the swinging door can catch on the frame BA of the vehicle by means of the second locks DS1, DS2, and if the sliding door PC is closed, the first lock will additionally catch on the corresponding striker of the sliding door. Similarly, if the swinging door PB is open, closing the sliding door may be achieved by virtue of the third lock catching on the frame of the vehicle, and if the swinging door is closed, the striker of the sliding door will in addition catch on the first lock PS mounted on the swinging door PB. Thus, when both doors are closed, the first lock necessarily connects the swinging door to the sliding door in such a way as, in particular, to withstand mechanical forces in the event of an accident. The first lock can just as easily be mounted on the sliding door to catch on a corresponding striker mounted on the swinging door.

Figure 2:
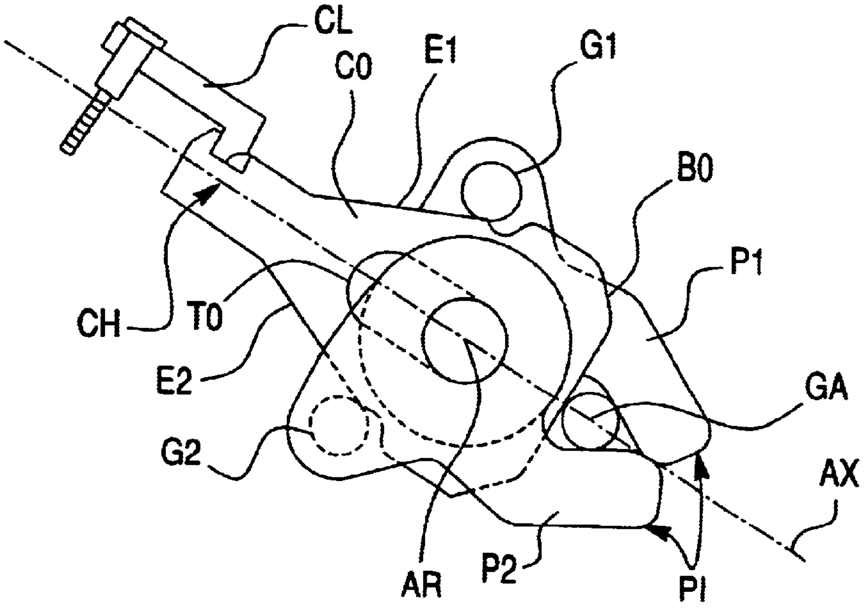
FIG. 2 is a schematic view of the first lock of the vehicle.

As visible in FIG. 2, the first lock PS comprises a slider CO which can move in terms of translation along an axis AX and which is connected in terms of movement to two latch bolts P1 and P2 which are mounted so that they can rotate on a common axis of rotation AR perpendicular to the axis AX. The latch bolts P1 and P2 and the slider CO are essentially flat components arranged one upon the other and through each of which the axis of rotation AR passes. The slider CO comprises an oblong hole TO extending along the axis AX and allowing the slider to move along the axis AX.

Figure 3:
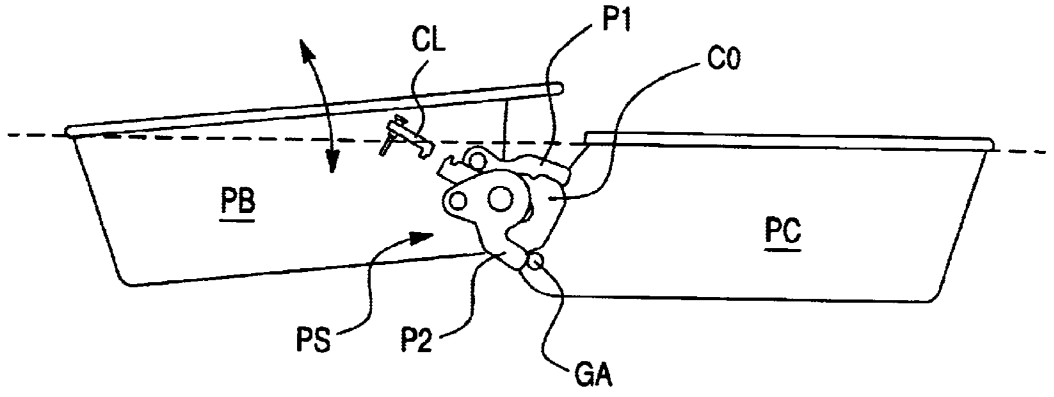
FIGS. 3, 4 and 5 illustrate the operation of the first lock.
Figure 4:
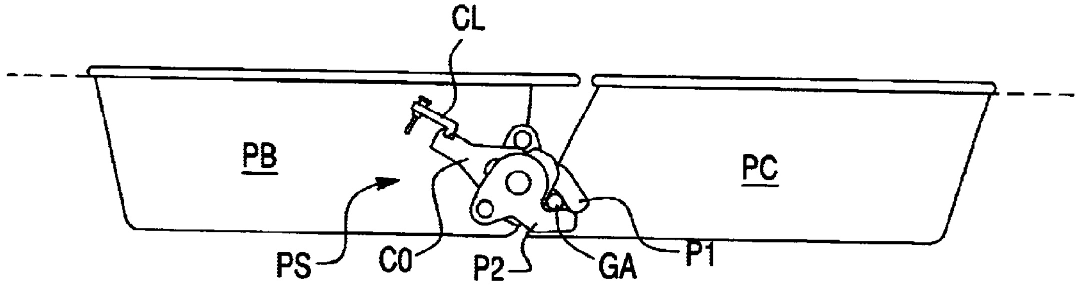
Figure 5:
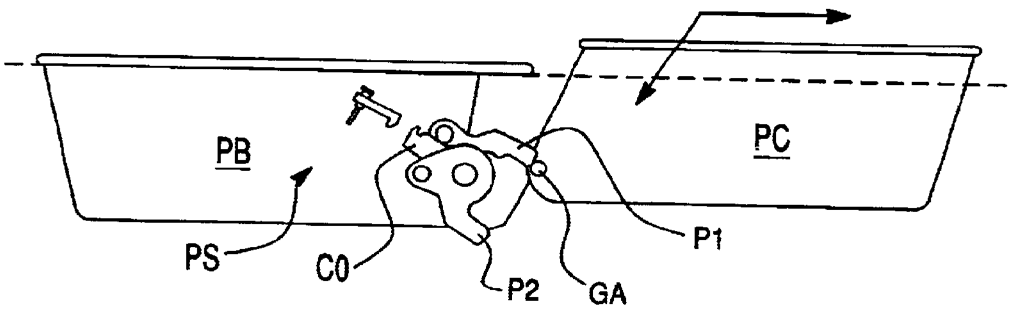

The latch bolts P1 and P2 are essentially symmetric and form a gripper PI which is connected in terms of movement to the slider CO and capable of trapping or releasing a striker GA as visible in FIGS. 3, 4 and 5, that is to say the striker mounted on the sliding door PC. The slider CO can move in terms of translation along the axis AX between a "deployed" position visible in FIGS. 3 and 5, and a "retracted" position visible in FIG. 4. When the slider is in the "deployed" position, the gripper PI is open to release or to receive the striker GA, and when the slider is in the "retracted" position, the gripper PI is closed to trap the striker as visible in FIG. 4.

When the swinging door is pushed back when the sliding door is closed, the striker GA mounted on the sliding door presses against a leading edge BO of the slider to cause it to move from the "deployed" position into the "retracted" position, which causes the striker GA to be trapped by the gripper PI, as visible in FIG. 4.

Similarly, when the sliding door is pushed back when the swinging door is closed, the striker GA presses against the slider to become entrapped by the gripper PI. The leading edge BO of the slider, which is inside the gripper, therefore accommodates the striker GA via a first side when the swinging door is pushed back (FIG. 3) and by a second side when the sliding door is closed again (FIG. 5).

In order to keep the first lock PS closed when the striker GA is trapped, the first lock PS also comprises a pawl CL arranged at one end of the slider CO in such a way that this pawl immobilizes the slider when the latter has reached its "retracted" position, by becoming housed in the immobilizing chamfer CH produced at the end of the slider. This pawl CL can be operated via a door handle in such a way that it releases the slider when this handle is actuated, to trigger the opening of the lock. More particularly, the lock comprises a spring-return system, not depicted, acting on the latch bolts P1 and P2, and tending to return the slider to the "deployed" position. In this way, as soon as the pawl CL releases the slider in response to action on the door handle, the slider comes to rest against the striker GA to open the gripper formed by the two latch bolts P1, P2 and to begin to open the door.

To improve the ergonomics of the vehicle, release of the slider CO by the pawl CL will be triggered either when the handle of the swinging door is actuated or when the handle of the sliding door is actuated. This triggering may for example be brought about by electrical assistance of the pawl CL or alternatively by cable or lever control of the pawl CL.

As visible in FIG. 2, each latch bolt P1, P2 comprises a roller G1, G2 which rests against a corresponding outer wall E1, E2 of the slider. These outer walls E1 and E2 are arranged symmetrically with respect to the axis AX at a nonzero angle so that the distance between each roller G1, G2 and the axis AX depends on the position occupied by the slider CO in its movement between the "retracted" position and the "deployed" position. Thus, when the slider is in the "retracted" position, the rollers G1, G2 are away from the axis, so that the gripper PI is closed, and when the slider is in the "deployed" position, the rollers G1, G2 are close to the axis so that the gripper PI is open. The spring-return system tends to cause each roller to press against the corresponding wall and may for this purpose comprise a spring acting on each latch bolt P1, P2.

Figure 6:
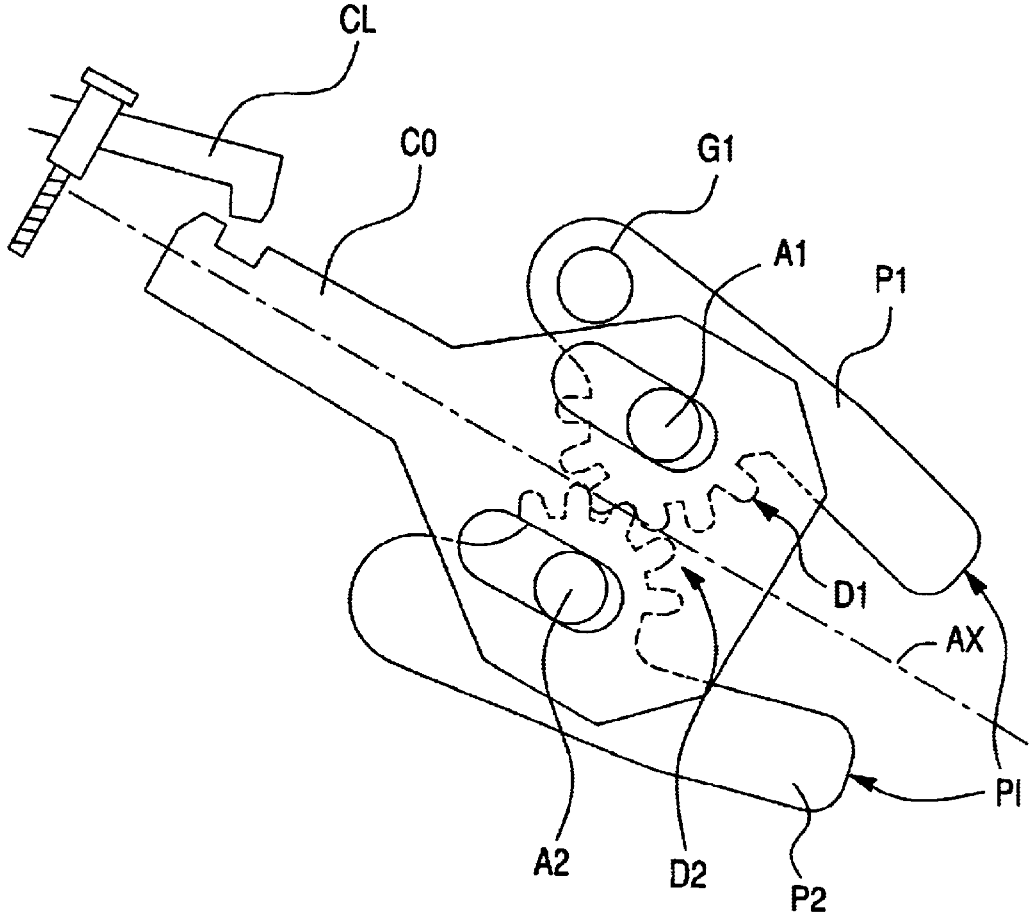
FIG. 6 illustrates an alternative embodiment of the first lock of the vehicle.

As an alternative, the latch bolts P1 and P2 may each comprise gear teeth D1, D2 and be mounted so that they can rotate on distinct axes A1 and A2 arranged on each side of the axis AX, as depicted in FIG. 6. In this alternative form, the sets of teeth D1 and D2 mesh in a zone close to the axis AX so that the two latch bolts are connected in terms of movement and so that the rotation of one causes the other to rotate. In this alternative, the slider CO is connected in terms of movement to just one of the latch bolts with a view to reducing the number of parts that make up the lock. Thus, a single roller G1 is needed to connect the gripper PI to the slider CO in terms of movement, and likewise a single return spring will suffice for both latch bolts, this making it possible to reduce the cost of manufacturing such a lock.

Figure 7:
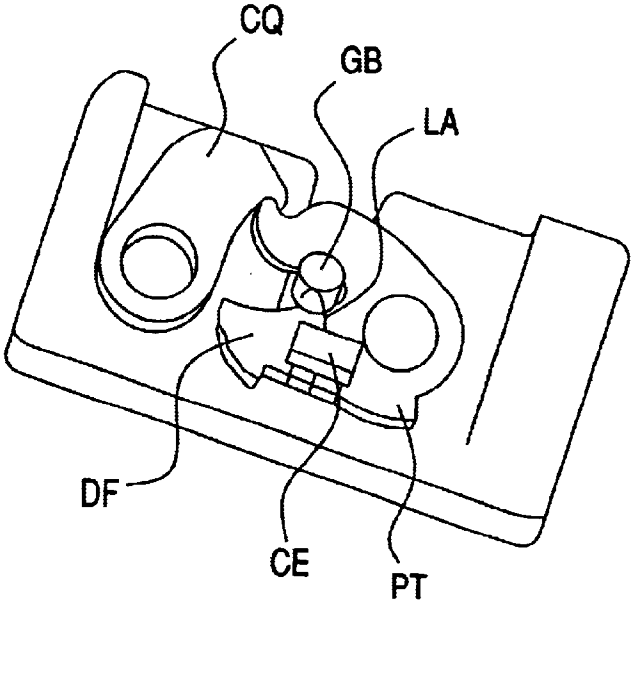
FIG. 7 illustrates one embodiment of the second and third lock with a closure detector.

In such a vehicle, geometric spread generally does not make it possible to guarantee simultaneous catching of all the locks connecting the swinging door to the frame, and the same is true of the sliding door. FIG. 1 depicts the swinging door with two locks DS1, DS2 connecting it to the frame. It is to be understood that more than two locks could be provided for connecting this door to the frame. In order to get around the problem of geometric spread, in the vehicle according to the invention, the second locks DS1, DS2 on the swinging door PB are adjusted in such a way that one of them is always the last to close. The same is true of the third locks of the sliding door PC. FIG. 7 depicts one embodiment of a second or third lock which has a rotary latch bolt PT which traps a striker GB engaged in the throat of the lock and a rotary pawl CQ which immobilizes the latch bolt PT when the striker is trapped.

The expression "adjustment" is to be understood as meaning the positioning, with a certain amount of play, of the pawl CQ with respect to the latch bolt PT in such a way as to leave the striker GB a certain freedom to move in the lock when it is trapped therein.

The second lock or third lock which always closes last is equipped with a closure detector shown in FIG. 7 to signal that the door on which this lock is mounted has been correctly closed.

The closure detector DF may comprise an electric switch CE having a moving blade LA which is moved by the striker when the latter is pushed into the lock as far as the position in which the pawl CQ immobilizes the latch bolt PT.

The benefit of such a detector is that it is placed at the back of the door lock where it is inaccessible to the user of the vehicle, so as to prevent the latter from simulating a condition in which the door is completely closed even though this door is open.

What is claimed is:

1. A motor vehicle comprising a swinging door and a sliding door mounted in a frame without a central post between the swinging door and the sliding door, and which comprises a first lock for connecting the swinging door to the sliding door, at least one second lock for connecting the swinging door to the frame, at least one third lock for connecting the sliding door to the frame and wherein the first lock comprises a slider which can move in terms of translation between a "deployed" position and a "retracted" position and two latch bolts mounted so that they can rotate and forming a gripper which is open when the slider is in the "deployed" position and which is closed when the slider is in the "retracted" position and a pawl capable of immobilizing said slider when it reaches the "retracted" position so as to keep the gripper closed and so as to release said slider when a handle for opening the lock is actuated; and a striker, wherein said latch bolts of the first lock also being connected in movement to said slider so that said gripper closes around said striker when said striker presses against the slider and causes it to move from the "deployed" position to the "retracted" position.

2. The vehicle as claimed in claim 1, in which the two latch bolts of the first lock are coupled in terms of movement by a gearset and the slider is connected in terms of movement to just one of the two latch bolts.

3. The vehicle as claimed in claim 2, in which said pawl releases said slider when a handle for opening the swinging door is actuated and said pawl releases said slider when a handle for opening the sliding door is actuated.

4. The vehicle as claimed in claim 3, in which the swinging door is connected to the frame by several second locks which are adjusted in such a way that when the swinging door is closed, there is a second lock which is always the last to close, this second lock being fitted with a closure detector.

5. The vehicle as claimed in claim 4, in which the sliding door is connected to the frame by a plurality of third locks which are adjusted so that when the sliding door is closed, there is one third lock which is always the last to close, this third lock being fitted with a closure detector.

6. The vehicle as claimed in claim 5, in which said closure detector is an electric switch which reacts to a striker being pushed into the lock.

* * * * *